(No Model.) 2 Sheets—Sheet 1.
H. W. LAFFERTY.
PRESS FOR SEPARATING LIQUID AND SOLID MATTER.
No. 332,718. Patented Dec. 22, 1885.
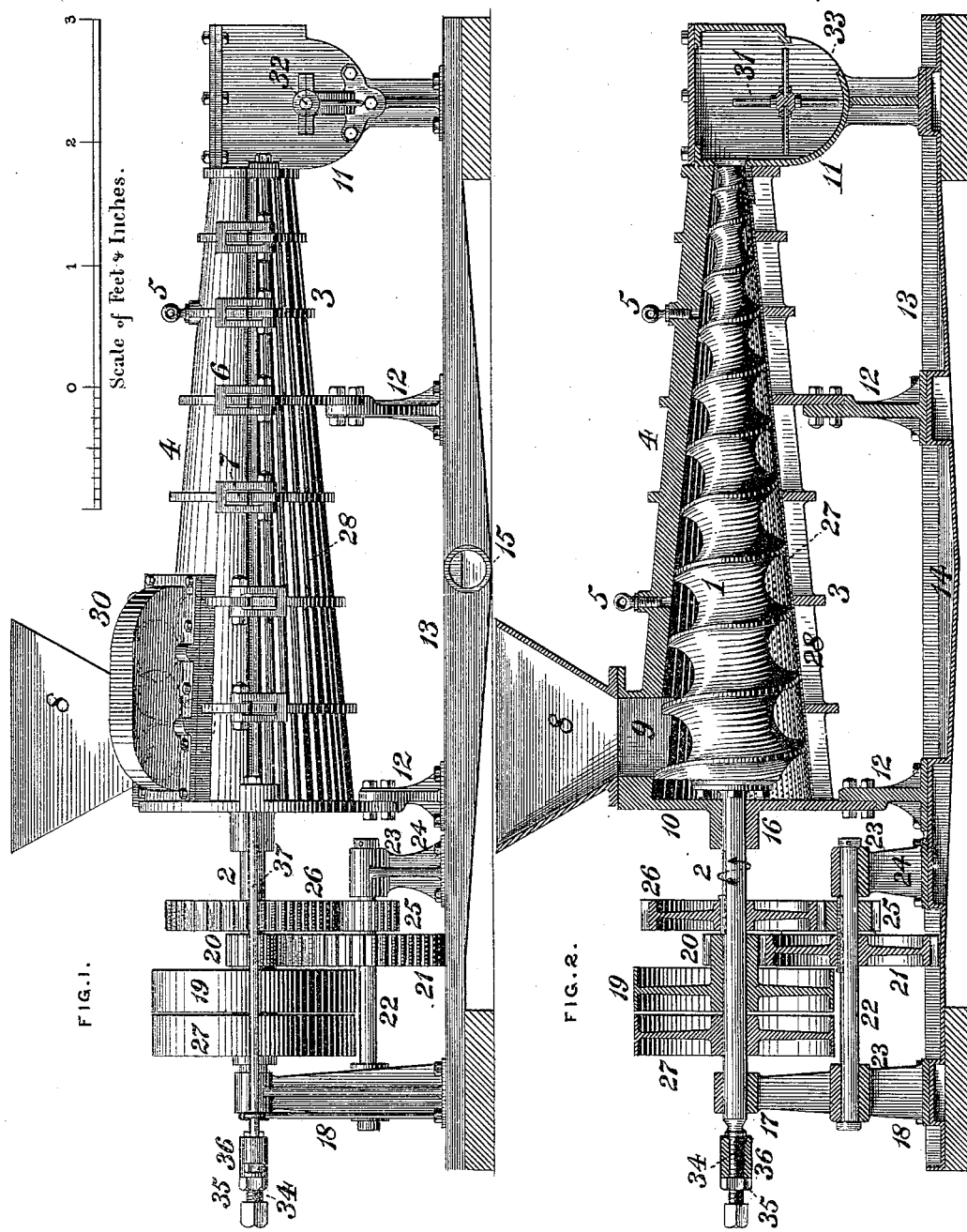
WITNESSES:
Geo. A. Vaillant.
C. M. Clarke.
INVENTOR:
Hugh W. Lafferty
by J. Snowden Bell,
atty.

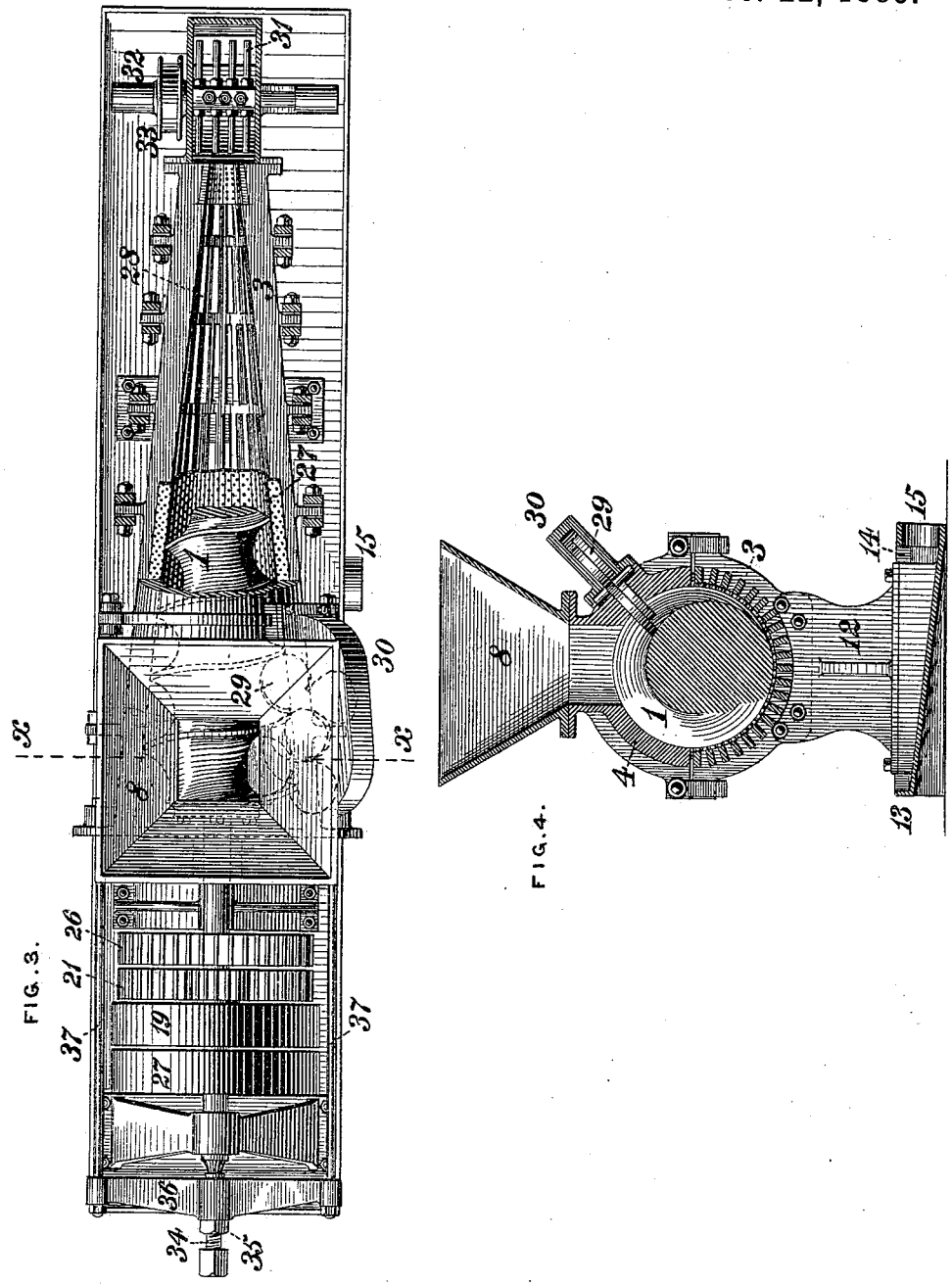

UNITED STATES PATENT OFFICE.

HUGH W. LAFFERTY, OF GLOUCESTER CITY, NEW JERSEY.

PRESS FOR SEPARATING LIQUID AND SOLID MATTER.

SPECIFICATION forming part of Letters Patent No. 332,718, dated December 22, 1885.

Application filed August 22, 1885. Serial No. 175,119. (No model.)

*To all whom it may concern:*

Be it known that I, HUGH W. LAFFERTY, of Gloucester City, in the county of Camden and State of New Jersey, have invented certain new and useful Improvements in Presses for Separating Liquid and Solid Matters, of which improvements the following is a specification.

The object of my invention is to provide effective and desirable means for separating by pressure the liquid from the solid constituents of various materials in which solid matter in a more or less finely-divided state is mingled with water or other liquids—as, for example, distillery-slops, wet grain, tankage from slaughter-houses, comminuted oleaginous fish, wet roots, bulbs, or fruits, and other materials analogous thereto in being of a pulpy or semi-fluid character.

To this end my invention, generally stated, consists in the combination of a tapering pressure-screw, a slotted or perforated casing, and a perforated separating-lining; also, in the combination of a tapering pressure-screw, a perforated casing, and an adjusting-screw for maintaining the pressure-screw in normal relation to the casing; also, in the combination of a tapering pressure-screw, a perforated casing, a feed-hopper communicating with the supply end of the casing, and a rotating breaker located adjacent to the delivery end of the casing; also, in the combination of a tapering pressure-screw, a perforated lower casing-section fixed to a base or support, a removable imperforate upper casing-section, and detachable clips or fastenings connecting said sections; also, in the combination of a tapering pressure-screw, a perforated casing composed of a fixed and a removable section, and one or more toothed disks engaging the thread of the pressure-screw, and adapted to rotate in a case, connected to the removable section of the casing of the pressure-screw; also, in the combination of a tapering pressure-screw, a perforated casing, a driving pulley and pinion fixed together and rotating freely on the shaft of the pressure-screw, a gear engaging the driving-pinion and fixed to a pinion upon a counter-shaft, and a gear fixed upon the pressure-screw shaft and engaging the counter-shaft pinion; also, in the combination of a tapering pressure-screw, a perforated casing, and a bed-plate supporting the casing, and forming a trough to receive liquid from the perforations thereof.

The improvements claimed are hereinafter fully set forth.

In the accompanying drawings, Figure 1 is a side view in elevation of a press embodying my invention; Fig. 2, a vertical longitudinal central section through the same; Fig. 3, a plan or top view, with a portion of the upper section and lining of the casing broken away; and Fig. 4, a vertical transverse section at the line $xx$ of Fig. 3.

In the practice of my invention I provide a conical or tapering pressure screw, 1, which is preferably made with a pitch decreasing from its larger to its smaller end, and is secured to one end of a shaft, 2, with which it is adapted to rotate within a corresponding tapered casing, in which it fits neatly, and which is composed of a fixed lower section, 3, and a removable upper section, 4, provided with eyebolts 5, by which it may be raised and swung clear of the lower section, when desired. The casing-sections are connected by detachable clips or fastenings 6, which are pivoted to lugs upon one section and fit over projections 7 on the other, thus serving to hold the sections firmly together when engaged with the projections, while susceptible of being readily released therefrom to permit the removal of the upper section. A feed-hopper, 8, is secured to the upper casing-section, 4, above a supply-opening, 9, near the larger end of the pressure-screw, and the end of the casing adjacent thereto is closed by a tight head, 10, formed upon the casing-sections, the opposite or delivery end of the casing being open and communicating with a discharge-chamber, 11. The casing is supported by standards 12, bolted to the lower section, 3, and to a bed-plate, 13, within which is formed a trough or receptacle, 14, for the liquid discharged from the casing, which is led off from the trough through a pipe connected to a nozzle, 15, on the side thereof. The shaft 2 of the pressure-screw 1 is mounted in a bearing, 16, formed on the casing-head 10, and a bearing, 17, on a standard, 18, fixed upon the bed-plate, and, together with the pressure-screw, is rotated by power from any suitable prime mover, applied through a belt passing around a driving-pulley, 19, which is cast integral with or secured to a driving-pinion, 20, and is mounted to rotate freely with said pinion upon the shaft 2. The pinion 20 engages a gear, 21, fixed upon a counter-shaft, 22, rotating in bearings 23 on the standard 18, and on a shorter standard, 24, adjacent to the head of the casing, said counter-shaft having likewise fixed upon it a pinion, 25, which engages a gear, 26, fixed upon the screw-shaft 2. If preferred, the gear 21 and pinion 25 may be cast or connected together, and may be mounted to rotate freely upon a fixed bearing. A loose-pulley, 27, on the screw-shaft, carries the driving-belt when the movement of the screw is stopped.

By the construction of double gearing, as above described, the pressure-screw may be rotated at the comparatively-slow speed, which is desirable for its efficient operation under the application of power from a fast-running shaft, and the compact arrangement of the gearing renders it applicable without material increase of the compass of the machine.

The pressure-screw 1 fits accurately within the upper section, 4, of the casing, and within a perforated separating-lining, 27, of sheet metal, fitting closely in the lower section, 3, which is provided with a series of slots or perforations, 28, which are materially larger than the openings or perforations of the lining, so as to permit free passage for the liquid passing through said perforations to the trough of the bed-plate, while affording a firm outer support to the lining against the compressive action of the pressure-screw working on its inner surface. The material supplied to the feed-hopper 8 and supply-opening 9 is carried therefrom by the pressure-screw to the delivery end of the casing, and being exposed in its traverse to a continuously-increasing pressure, owing to the progressive diminution of sectional area of the helical passage through which it moves by the taper of the screw and casing, its liquid constituents are forced out through the perforations of the lining 27 and slots 28 of the lower casing-section and fall into the trough of the bed-plate, while the solid constituents are discharged in a substantially dry state from the delivery end of the casing into the discharge-chamber 11.

In order to prevent backward flow of the material supplied to the casing and insure its continuous discharge, one or more disks or valves, 29, each having a series of curved teeth, which engage the spaces between the threads of the pressure-screw 1, are mounted on short shafts rotating in a case, 30, secured to the upper casing-section, 4, at one side of the feed-hopper, said disks backing up the material in the thread of the pressure-screw on the faces which they present to it, and keeping the thread behind them clear for each new charge of material. The disks and their case, being fixed to and removable with the upper casing-section, present no obstruction to free access to the lower section whenever required. Said valve-disks, which are not *per se* of my present invention, are fully set forth in my Letters Patent No. 178,647, dated June 13, 1876.

The solid matter delivered from the discharge end of the casing, which tends to be compressed into a continuous mass, is disintegrated by a beater which revolves rapidly in the discharge-chamber, said beater being composed of a series of arms or blades, 31, secured upon a shaft, 32, mounted in bearings in the sides of the discharge-chamber 11, and carrying a driving-pulley, 33, through which it is rotated by a belt from the prime mover. The dried and disintegrated material drops from a discharge-opening, 33, in the chamber 11, into a bin or other suitable receptacle, or may be removed as delivered by a conveyer or elevator.

In order to compensate for wear or lost motion of the pressure-screw and maintain the same in normal relation to its casing, an adjusting-screw, 34, bearing against the outer end of the shaft 2, and provided with a jam-nut, 35, engages a nut in a thrust-block, 36, connected in this instance by tension-rods 37 to the casing of the pressure-screw. The pressure of the latter being exerted through the adjusting-screw 34 upon the thrust-block 36 as an abutment, the screw may be moved forward in its casing from time, as required, by correspondingly tightening the adjusting-screw.

I claim as my invention and desire to secure by Letters Patent—

1. The combination of a tapering pressure-screw, a corresponding casing having a series of slots or perforations, and a perforated separating-lining fitting the periphery of the thread of the pressure-screw, substantially as set forth.

2. The combination of a tapering pressure-screw and a casing having an imperforate upper section, and a slotted or perforated lower section provided with a lining fitting the periphery of the thread of the pressure-screw and having a series of perforations of lesser area than the slots or perforations of the casing-section, substantially as set forth.

3. The combination of a tapering pressure-screw, a slotted or perforated lower casing-section fixed to a bed or support, a removable imperforate upper casing-section, and a series of detachable clips or fastenings connecting said sections, substantially as set forth.

4. The combination of a tapering pressure-screw, a perforated casing, a feed-hopper and supply-opening communicating with the supply end of the casing, and a rotating breaker mounted in bearings in a discharge-chamber communicating with the delivery end of the casing, substantially as set forth.

5. The combination of a tapering pressure-screw, a perforated casing composed of a fixed and a removable section, and one or more toothed disks engaging the thread of the pressure-screw and mounted in bearings in a case connected to the removable section of the casing, substantially as set forth.

6. The combination of a tapering pressure-screw, a driving-shaft secured to the larger end thereof, a perforated casing having a supply-opening adjacent to the larger end of the pressure-screw, and a discharge-opening at its opposite end, and an adjusting-screw adapted to bear against the outer end of the driving-shaft and engaging a nut in a thrust-block connected with the casing, substantially as set forth.

7. The combination of a tapering pressure-screw, a perforated casing, and a bed-plate supporting the screw and casing and forming a trough or receptacle for liquid discharged from the perforations of the casing, substantially as set forth.

8. The combination of a tapering pressure-screw having a driving-shaft secured to its larger end, a perforated casing within which said screw rotates, a driving pulley and pinion fixed together and mounted to rotate freely on the driving-shaft, a gear engaging the driving-pinion and fixed to a pinion upon a counter-shaft, and a gear fixed upon the driving-shaft and engaging the counter-shaft pinion, substantially as set forth.

HUGH W. LAFFERTY.

Witnesses:
EDMUND W. LAFFERTY,
JAMES M. CASSADY.